Patented Jan. 27, 1953

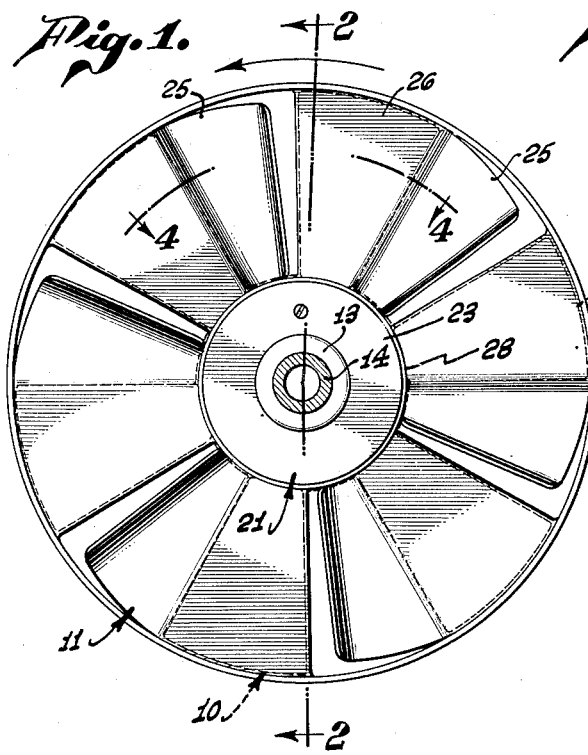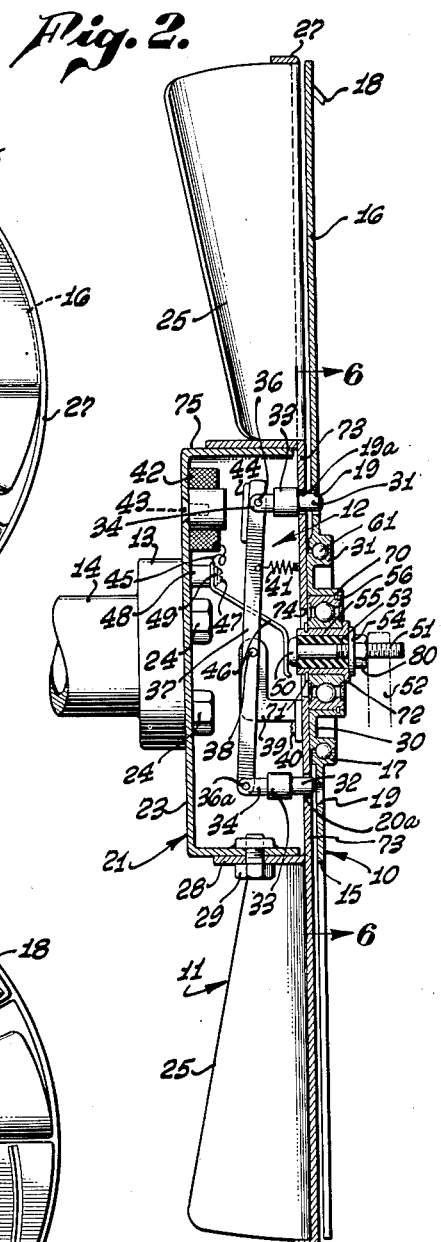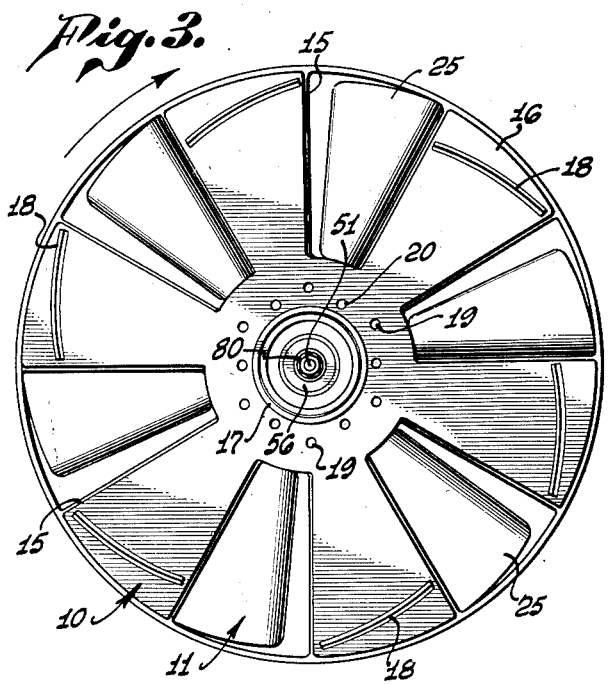

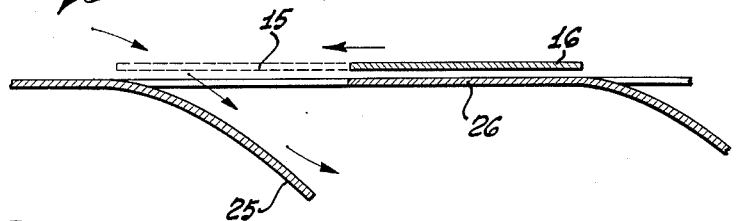
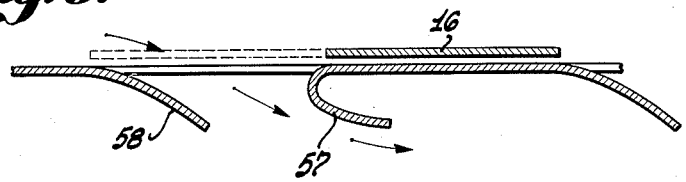
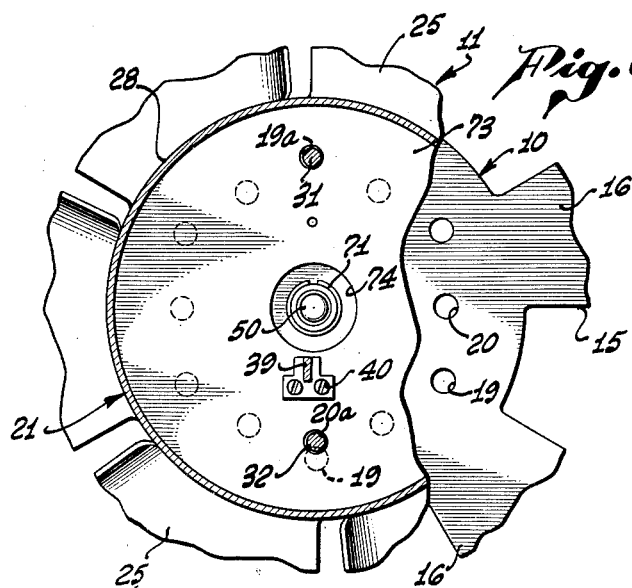
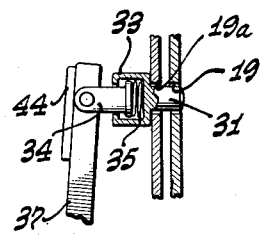
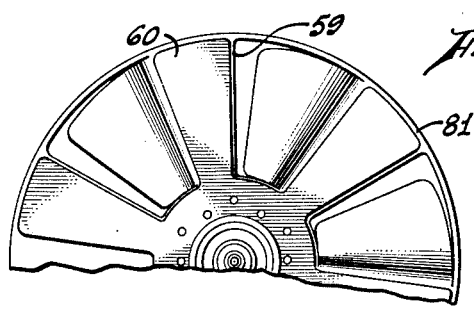

2,626,743

UNITED STATES PATENT OFFICE 2,626,743

AIR DISPLACEMENT ROTOR

Elmore J. Sanders, San Gabriel, Calif.

Application September 16, 1948, Serial No. 49,507

13 Claims. (Cl. 230—270)

This invention relates generally to vaned rotor elements adapted for use in a medium of air or other fluid, and concerns more particularly novel means for controllably varying the volume of fluid passing through such an element.

In many situations where vaned rotor elements of either the driven fan or windmill type are employed, it is desirable to provide means for varying the rate of fluid flow. For instance, optimum results can be achieved from an internal combustion engine only if the air displacing effectiveness of the cooling fan can be varied in response to changes in operating conditions, such as increase or decrease of load, change in atmospheric temperature, or the like.

Variable pitch propellers have heretofore been successfully used in certain situations where a variable rate of fluid flow is desirable. However, the relative complexity of such propellers has largely limited their use to heavy equipment in which flow variation is essential irrespective of cost. For lighter uses, as in the automobile engine, it has been found impractical to employ the variable pitch propeller because of its high cost. Consequently, in the absence of an adequate sufficiently inexpensive substitute, no variable flow fan has been used in these situations.

A major object of the present invention is to provide a variable flow vaned rotor element having operating characteristics substantially as satisfactory as the variable pitch propeller and yet of such structural simplicity as to be practically useable in the myraid of situations where expense has precluded use of the variable pitch propeller. In accordance with the invention, this result is achieved by the use of a rotor device comprising a rotatable shutter section having air-passing apertures, an axially adjacent vane carrying section rotatable with the shutter section, and means for controllably varying the relative angular positions of the two sections to vary the air displacement therethrough. Though it is broadly contemplated that the positioning means may assume various forms, they preferably comprise detent means operable to selectively maintain the two sections in any one of two or more predetermined positions, desirably in response to actuation of an automatic control device such as a thermostatic switch. Relative movement of the two sections between these positions may be effected while they are rotating by temporarily ceasing to drive one section while continuing to drive the other, thereby permitting the undriven section to slow until the desired angular relation is attained. Detent means may then automatically interlock the sections for rotation together in the new angular relation.

It is a further object of this invention to provide electrical means for remotely controlling the relative angular positions of the two sections. For this purpose, the detent or other positioning means may be operable in response to energization of electrical solenoid means.

It is contemplated that the present device may be employed in any situation where a variable flow vaned rotor element is desirable. For instance, the device may be used for either blowing or drawing a fluid, such as air, or for rotation by a stream of fluid as in a wind powered generator.

The above and further features and objects of the present invention will be better understood from the following detailed description of a typical embodiment, as illustrated in the accompanying drawings, in which:

Fig. 1 is a rear view of the vaned rotor device in the open position;

Fig. 2 is an enlarged transverse section taken on line 2—2 of Fig. 1;

Fig. 3 is a front view of the device;

Fig. 4 is an enlarged fragmentary view taken along line 4—4 of Fig. 1;

Fig. 5 illustrates a variational form of fan blade arrangement;

Fig. 6 is a fragmentary vertical section taken on line 6—6 of Fig. 2;

Fig. 7 is an enlarged fragmentary section showing one of the detent pins in interlocking position; and, Fig. 8 is a front view similar to Fig. 3 but showing a variational blade and shutter arrangement to provide for greater flow in the open position.

Referring first to Figs. 1 through 4, 6 and 7, the form of fan there illustrated comprises a shutter section or disc 10, a vane carrying section generally indicated at 11, mechanism 12 for controlling the relative angular positions of these two sections, and a body portion 21. The device is shown typically as rigidly secured to flange 13 of rotating shaft 14.

Shutter section 10 is formed as a disc having angularly spaced apertures 15 of radially divergent configuration, and intermediate similarly divergent fluid blocking shutter surfaces 16. The disc has a central opening about which an outer ball bearing race 17 is formed for engagement of balls 61 to permit free rotation of the disc relative to the vane carrying section. Each of the shutter areas 16 may have a projection 18, preferably of spiral design, adapted to slightly increase fluid resistance to the rotation of disc 10, for a purpose later to be described.

Radially outwardly of bearing race 17, the disc has two alternately disposed series of angularly spaced openings 19 and 20. All of the openings 19 are at a common distance from the center of rotation of the disc, which distance is greater than the corresponding radial distance of the various holes 20 from the center.

Body portion 21 comprises a rear wall 23 attachable to flange 13 as by screw bolts 24, and a cylindrical wall 75 extending forwardly from wall 23 for housing the control mechanism 12 and carrying vane section 11.

Section 11 is represented as formed from a disc having a central opening 74 and stamped or otherwise deformed to present a plurality of angularly disposed spaced vanes 25, between which are located a series of air blocking closed surfaces 26 lying in the plane of rotation and of substantially the same configuration as air blocking surfaces 16 of the shutter disc. Vanes 25 are reenforced at their outer extremities by peripheral annular flange 27 and inwardly by attachment to ring 28, as by welding thereto. Ring 28, in turn, fits about the cylindrical wall of the body portion for attachment to the body by one or more bolts 29.

Inwardly beyond ring 28, section 11 presents a disc portion 73 disposed in the plane of rotation and containing openings 19a and 20a adapted to register in different relative positions of the sections with shutter openings 19 and 20 respectively. Annular member 30 is rigidly secured to the forward face of portion 73 inwardly of openings 19a and 20a. Member 30 presents an outer flange 31 serving as a ball bearing race cooperating with race 17 and balls 61 to permit rotation of the shutter disc relative to the vanes.

It will be readily understood that, when the vane carrying section and the shutter section are in the relative positions illustrated in Figs. 1 through 4, that is when the two blocking areas are adjacent, the space immediately in front of each blade is open for free passage of air, and the device is in its maximum flow position. However, with the relative positions of the two sections changed to locate the various shutter areas 16 directly in front of the blades 25, there is a substantially continuous blocking wall at the forward end of the device, which prevents the axial flow of any air therethrough. It is at this point noted that the normal path of axial fluid flow through the device is preferably from the shutter side of the fan, as seen in Fig. 4, so that the shutter acts in closed condition to close off the normal suction side of the fan.

In all positions in which one of the openings 19 registers with opening 19a, the shutter disc is in the open position of Figs. 1 through 4, whereas in the positions of registry between an opening 20 and 20a, the disc is in closed position. Mechanism 12 operates to select the one of these positions in which the shutter disc is maintained at any particular time. For this purpose, detent pins 31 and 32 are alternately insertible through registering openings to serve as interlocking means for maintaining the two sections in the desired relation. Referring to Fig. 7, each of these pins is formed integrally with a cylindrical body 33, within which a plunger 34 is movable. A spring 35 yieldingly urges each plunger outwardly from its retaining body and pin. The two plungers 34 are pivotally secured at 36 and 36a to opposite ends of lever 37, which is pivotally supported at 38 by fulcrum bracket 39. This bracket is secured to the rear face of portion 73 of the vane carrying section, as by screws 40. Pins 31 and 32 are disposed unlike distances from the center of rotation, these distances corresponding respectively to the distances of openings 19 and 20 from the center. Spring 41 normally urges lever 37 into the illustrated position in which pin 31 maintains the two sections interlocked by passage through opening 19a and one of the openings 19. Solenoid 42, secured to wall 23 by screw 43, operates, when energized, to urge armature element 44 and the corresponding end of lever 37 rearwardly, to pivot the lever about point 38, and withdraw pin 31 from opening 19. This compresses the spring 35 associated with pin 32, to urge that pin through the next opening 20 to register with opening 20a. In this manner, the relative setting of the two sections may be changed from open to closed position.

One terminal of the solenoid 42 is grounded to the body wall 23 if metallic, and the other terminal connected through wire 45 to contact 46. This contact is supported from wall 23 as by screw 47, and insulated therefrom by sleeve 48 and washer 49. Contact 46 engages head 50 of screw 51 which is secured to conducting member 52. Insulators 53 and 54, secured to screw 51 by nut 80, isolate the screw electrically from sleeve 55. Ball bearing 56, secured in position relative to member 30 by lock ring 70, permits free rotation of the vane carrying section relative to contact screw 51 and its associated parts. Sleeve 55 is maintained against axial displacement from within bearing 56 by lock ring 71 and shoulder 72.

In operation, vane carrying section 11 rotates at all times with shaft 14. In the illustrated open position of maximum flow, shutter disc 10 is angularly interlocked with the vane carrying section by passage of pin 31 through openings 19 and 19a. In this position, rotation of the two sections together serves to induce fluid flow axially past the vanes 22. If it is desired to alter the condition of the apparatus to stop the flow of air, an electrical circuit including a ground connection and a connection to lead 52 is closed. This energizes the circuit to solenoid 42 through contact screw 51, contact 46, and wire 45, to urge armature element 44 toward the solenoid and pivot lever 37 about point 38. Such pivotal movement of the lever withdraws pin 31 from opening 19 in the shutter disc to temporarily cease driving the shutter disc and permit its deceleration relative to the vane carrying section. Such slowing of the shutter disc is accentuated by the fluid resistance offered to movement of shutter projections 18. Pivoting of the level compresses the spring 35 associated with pin 32 to urge pin 32 through the first one of the openings 20 to register with opening 20a. Such movement of the pin into an opening 20 again interlocks the shutter disc with the vane carrying section to again drive the disc at a speed equal to that of the vane section. The relative movement between sections which brings opening 20a and an opening 20 in registry simultaneously moves fluid blocking portions 16 of the shutter disc directly in front of the vanes to close off all axial flow of air to the fan. The device is then in closed position.

As will readily be understood, subsequent breaking of the circuit to solenoid 42 permits spring 41 to pivot level 37 back to the illustrated position to withdraw pin 32 from the disc opening and urge pin 31 into the first opening 19 registering with opening 19a. In that manner, breaking of the electrical circuit shifts the disc back into open condition.

A particular advantage of the present device when used as a fan is that, when the shutter disc is in closed condition it inherently acts, by virtue of its proximate relation to the vane carrying section, and the fact that the disc substantially completely closes off all axial fluid discharge, to convert the fan from an axial flow fan to a centrifugal impeller. That is, the vanes cease their axial discharge, and commence to discharge air radially outwardly. This radial discharge of air may then be used to produce a secondary circulation of air, which may be put to any desired use.

Fig. 5 illustrates a variational form of blade arangement for use under certain circumstances, in which a streamlining element 57 is disposed opposite each vane 58 for decreasing resistance to fluid flow through the fan.

In the Fig. 8 form, radially divergent apertures 59 of the shutter disc are of substantially greater angular extent than the fluid blocking surfaces 60 of the shutter and 81 of the vaned section, to materially reduce the area blocked off in the open condition and thereby increase the maximum rate of fluid flow through the device. Such an arrangement is possible since it has been discovered that substantially all of the fluid flow can be stopped without necessarily employing shutter blocking areas of sufficient size to extend across the entire vane area.

In the claims, the terms "fluid displacement rotor," "fluid displacement vanes," and the like are intended to cover a rotor structure of either the fan or turbine type, i. e., a structure which either moves or is moved by a fluid stream.

I claim:

1. A rotor device comprising a rotatable first section having fluid passing apertures, an axially proximate second section rotatable with and relative to said first section and carrying shutter means operable to vary the effective fluid passing area of said apertures upon relative rotation between the sections, angularly disposed fluid displacement blades mounted for rotation with the sections and positioned generally opposite said first section at locations to interact with a fluid stream passing through said apertures, holding mechanism operable to interconnect the sections for rotation together in different relative angular positions, said holding mechanism including a movable detent element carried by one of the sections and engageable with the other section, and an electrical solenoid for actuating said detent element.

2. A rotor device comprising a rotatable first section having fluid passing apertures, an axially proximate second section rotatable with and relative to said first section and carrying shutter means operable to vary the effective fluid passing area of said apertures upon relative rotation between the sections, angularly disposed fluid displacement blades mounted for rotation with the sections and positioned generally opposite said first section at locations to interact with a fluid stream passing through said apertures, one of said sections having a hollow radially inner portion, releasable means for holding said sections against relative rotation in different relative angular positions, and remotely controllable means carried by said one section within said hollow portion thereof for actuating said holding means to vary the relative angular positions of the sections and the fluid displacement therethrough.

3. A rotor device comprising a rotatable first section having angularly spaced fluid passing apertures and intermediate shutter surfaces, an axially proximate second section rotatable with and relative to said first section and having similarly angularly spaced vanes and intermediate shutter surfaces, said apertures on the first section and said shutter surfaces on both sections being of substantially equal angular extent, releasable means for holding said sections against relative rotation in different relative angular positions in which the shutter surfaces of the second section are selectively adjacent either the apertures of the first section or its shutter surfaces, and control mechanism operable to actuate said holding means to change the relative positions of said sections while the sections are rotating, said control mechanism including means rotatable with and movable relative to both of said sections.

4. A fluid displacement rotor mechanism comprising a rotor having angular fluid displacement vanes, shutter means rotatable with the rotor and adjustable relative thereto to vary the rate of fluid flow past said vanes, means for releasably holding the rotor and shutter means in different relative positions, and control mechanism operable to actuate said holding means to change the relative positions of said rotor and shutter means while the rotor is rotating, said control mechanism including means rotatable with and movable relative to both the rotor and shutter means.

5. An air fan assembly comprising a rotor having angular axial discharge air displacing vanes, shutter means rotatable with and relative to the rotor and operable by said relative rotation to vary the rate of fluid displacement by said vanes, means for releasably holding the rotor and shutter means in different relative angular positions, and control mechanism operable to actuate said holding means to change the relative positions of said rotor and shutter means while the rotor is rotating, said control mechanism including means rotatable with and movable relative to both the rotor and shutter means.

6. A fluid displacement rotor mechanism comprising a rotatable first section having angular fluid displacement vanes, a second section rotatable with and relative to said first section and having shutter means operable to vary the rate of fluid flow past said vanes upon relative rotation between the sections, means for holding said sections in different relative angular positions and releasable to permit relative rotation therebetween, and control mechanism operable to release said holding means, said control mechanism including means rotatable with and movable relative to both of said sections, one of said sections being free for rotation relative to the other section by virtue of fluid resistance to its motion upon release of said holding means.

7. A fluid displacement rotor mechanism comprising a rotor having angular fluid displacement vanes, shutter means rotatable with the rotor and adjustable relative thereto to vary the rate of fluid flow past said vanes, means for releasably holding the rotor and shutter means in different relative positions, and electric power operated control mechanism rotatable with said rotor and shutter means and operable to actuate said holding means to change the relative positions of said rotor and shutter means.

8. A fan assembly comprising a fan rotatable about an axis and having angular fluid displacement vanes normally taking suction and discharging axially, and shutter means rotatable with the fan and extending across the suction side thereof, said shutter means being adjustable relative to said vanes to vary the rate of fluid flow therepast, and means for adjusting said shutter means relative to said vanes.

9. A fluid displacement rotor mechanism comprising a rotatable first section having angular fluid displacement vanes, a second section rotatable with and relative to said first section and having shutter means operable to vary the rate of fluid flow past said vanes upon relative rotation between the sections, means for holding said sections in different relative angular positions and releasable to permit relative rotation therebetween, said holding means including a detent element rotating with the sections and movable axially relative to both of said sections, and control mechanism operable to release said holding means, said control mechanism including means rotatable with and movable relative to both of said sections, one of said sections being free for rotation relative to the other section by virtue of fluid resistance to its motion upon release of said holding means.

10. A fluid displacement rotor mechanism comprising a rotatable first section having angular fluid displacement vanes, a second section rotatable with and relative to said first section and having shutter means operable to vary the rate of fluid flow past said vanes upon relative rotation between the sections, means for holding said sections in different relative angular positions and releasable to permit relative rotation therebetween, said holding means including a detent element rotating with the sections and movable axially relative to both of the sections between holding and released positions, an electric solenoid carried by and rotatable with one of said sections and operable to actuate said detent element axially between said positions, and electrically conductive means operable to conduct electricity to said solenoid while the sections are rotating.

11. A fluid displacement rotor mechanism comprising a rotatable first section having angular fluid displacement vanes, a second section rotatable with and relative to said first section and having shutter means operable to vary the rate of fluid flow past said vanes upon relative rotation between the sections, means for holding said sections in different relative angular positions and releasable to permit relative rotation therebetween, said sections having two sets of openings adapted to register at two different relative angular positions of the sections, a pair of pins to be selectively inserted through said sets of registering openings to angularly interlock said sections in said positions, a lever arm carrying said pins at its opposite ends and pivotable about an intermediate point to move said pins alternately into and out of their respective interlocking positions, and control mechanism operable to actuate said lever to move the pins into and out of said interlocking positions while the sections are rotating, said control mechanism including means rotatable with and movable relative to both of said sections.

12. A fan mechanism comprising a rotor having angular fluid displacing normally axial discharge vanes and containing fluid passing openings between said vanes, shutter means rotatable with the rotor and adjustable relative thereto between open and closed positions to control the rate of axial fluid displacement by said vanes, power driven means operatively connected to said rotor and shutter means and acting independently of the exertion of fluid force against said vanes to rotate said rotor and shutter means in each of said relative positions, said shutter means in said closed position extending substantially entirely across the area of said fluid passing openings in the rotor at one axial side of the vanes to close off substantially the entire axial flow at said side, said shutter means being positioned in axially proximate relation to said vanes to convert the rotor to a centrifugal impeller discharging radially outwardly in said closed position of the shutter means, and control mechanism operable to selectively maintain said shutter means in said open and closed relative positions respectively.

13. An air fan assembly comprising a rotor having angular air displacing normally axial discharge vanes and containing fluid passing openings between said vanes, shutter means rotatable with the rotor and rotatably adjustable relative thereto between open and closed positions to control the rate of axial fluid displacement by the vanes, power driven means operatively connected to said rotor and shutter means and acting independently of the exertion of fluid force against said vanes to rotate the rotor and shutter means together in each of said relative positions, said shutter means in said closed position extending across substantially the entire area of said fluid passing openings in the rotor at one axial side of the fan to close off substantially the entire axial flow at said side, said shutter means being positioned in axially proximate relation to said vanes to convert the rotor to a centrifugal impeller discharging radially outwardly in said closed position of the shutter means, and control mechanism operable to selectively maintain said shutter means in said open and closed positions respectively.

ELMORE J. SANDERS.

REFERENCES CITED

The following references are of record in the file of this patent:

UNITED STATES PATENTS

| Number | Name | Date |
|---|---|---|
| 509,143 | Smith | Nov. 21, 1893 |
| 910,760 | Wood | Jan. 26, 1909 |
| 1,072,189 | Sparks | Sept. 2, 1913 |
| 1,412,313 | Negri | Apr. 11, 1922 |
| 1,462,151 | Seymour | July 17, 1923 |
| 2,383,001 | Mader | Aug. 21, 1945 |
| 2,383,002 | Mader | Aug. 21, 1945 |
| 2,450,745 | Baumann | Oct. 5, 1948 |

FOREIGN PATENTS

| Number | Country | Date |
|---|---|---|
| 85,418 | Germany | July 22, 1894 |